United States Patent

Shepherd

[15] 3,645,114
[45] Feb. 29, 1972

[54] FLEXIBLE ROTARY DRIVE TRAIN HAVING SPLINED COUPLING WITH ELASTOMERIC CUSHIONS

[72] Inventor: Willard W. Shepherd, Whittier, Calif.
[73] Assignee: Shepherd Machinery Co., Industry, Calif.
[22] Filed: May 8, 1970
[21] Appl. No.: 35,704

[52] U.S. Cl. ............................................. 64/14, 64/27 NM
[51] Int. Cl. .......................................................... F16d 3/64
[58] Field of Search ............................................. 64/14, 27 R

[56] References Cited

UNITED STATES PATENTS

| | | |
|---|---|---|
| 3,246,484 | 4/1966 | Haddad et al. ............................. 64/27 |
| 2,621,493 | 12/1952 | Croset ....................................... 64/14 |
| 2,849,871 | 9/1958 | Moeller ..................................... 64/14 |
| 3,066,503 | 12/1962 | Fleming et al. ....................... 64/14 X |

Primary Examiner—Kenneth W. Sprague
Attorney—Harris, Kiech, Russell & Kern

[57] ABSTRACT

A flexible rotary drive train comprising two axially spaced universal joints interconnected by a splined coupling having elastomeric cushions interposed between the internal and external splines on the outer and inner members of the coupling. The inner and outer members of the coupling are relatively moveable in the axial direction through a substantial distance to accommodate major variations in the length of the drive train in operation, while the elastomeric cushions serve to damp torsional vibration.

3 Claims, 2 Drawing Figures

PATENTED FEB 29 1972 3,645,114
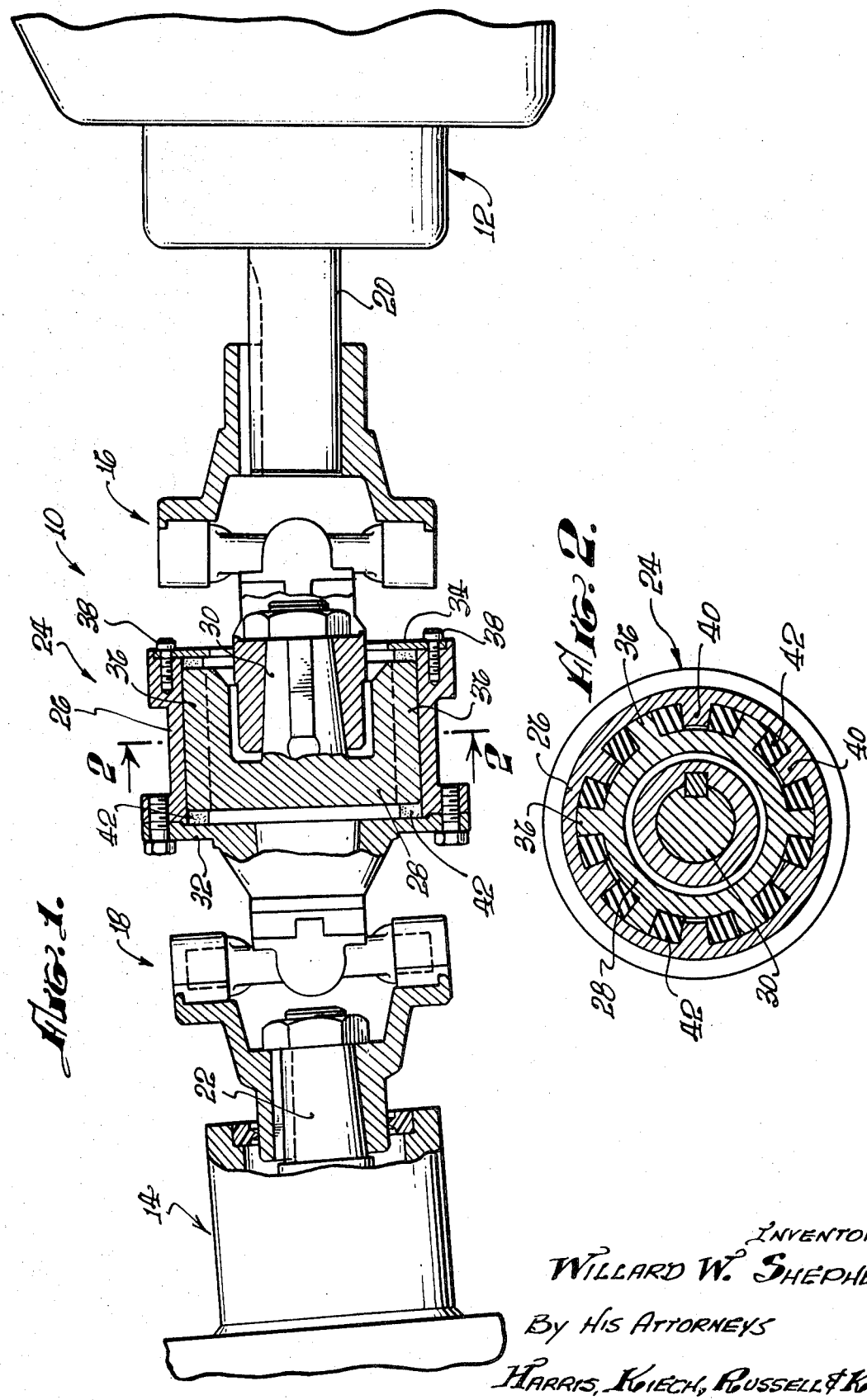
INVENTOR.
WILLARD W. SHEPHERD,
By His Attorneys
HARRIS, KIECH, RUSSELL & KERN.

FLEXIBLE ROTARY DRIVE TRAIN HAVING SPLINED COUPLING WITH ELASTOMERIC CUSHIONS

BACKGROUND OF INVENTION

The present invention relates in general to a flexible rotary drive train capable of damping torsional vibration and variable in length to accommodate variations in the axial spacing of the components interconnected by the drive train in operation.

More particularly, the invention contemplates a flexible rotary drive train which includes two axially spaced universal joints interconnected by a splined coupling having inner and outer members which are axially moveable and the respective outer and inner splines of which are separated by elastomeric cushions.

SUMMARY AND OBJECTS OF INVENTION

An important object of the invention is to provide a flexible rotary drive train of the foregoing general nature wherein the inner and outer members of the coupling are relatively moveable in the axial direction through a substantial distance to accommodate major relative displacements of the components interconnected by the drive train. Thus, if the drive train of the present invention is utilized in a vehicle, for example, it is capable of accommodating large variations in the spacing of a transmission and a differential due to spring flexure, engine mount flexure, and the like.

More particularly, an important object of the invention is to provide a drive train wherein the length of the inner member is substantially less than the spacing of limiting stops on the outer member to permit substantial axial relative movement of the outer and inner members.

Another and significant object of the invention is to provide a coupling wherein the inner member is telescopically disposed within the outer member in unrestrained sliding engagement therewith in the axial direction. With this construction, since the inner and outer members are in axial sliding engagement, concentricity of these members is maintained to avoid inducing any unbalance from lack of concentricity, which is an important feature.

Another object is to provide a structure wherein the difference between the spacing of the stops and the length of the inner member is at least about 6 percent of the center-to-center spacing of the universal joints.

Another and important object of the invention is to provide a flexible rotary drive train wherein one of the stops is an annular stop detachably connected to the outer member so that it may be removed to permit withdrawal of the inner member from the outer member. With this construction, the elastomeric cushions can be replaced readily if necessary, which is an important feature.

Yet another object of the invention is to provide a flexible rotary drive train of the foregoing nature wherein the inner member is cup shaped and is provided therein with a coaxial shaft connected to one of the universal joints. This construction has the effect of shortening the drive train, which is in important feature also.

The foregoing objects, advantages, features and results of the present invention, together with various other objects, advantages, features and results thereof which will be evident to those skilled in the flexible rotary drive train art in the light of this disclosure, may be achieved with the exemplary embodiment of the invention illustrated in the accompanying drawing and described in detail hereinafter.

DESCRIPTION OF DRAWING

In the drawing:

FIG. 1 is a view, predominantly in longitudinal section and partially in elevation, of a flexible rotary drive train which embodies the invention; and FIG. 2 is a transverse sectional view through a coupling of the invention taken along the arrowed line 2—2 of FIG. 1 of the drawing.

DETAILED DESCRIPTION OF EXEMPLARY

Embodiment of Invention

In the drawing, the numeral 10 designates a flexible rotary drive train of the invention which is shown as interconnecting driving and driven components 12 and 14 subject to variations in spacing and/or alignment. The driving and driven components may be any desired units requiring damping of torsional vibration and/or accommodation of substantial relative axial movement.

The drive train 10 includes two axially spaced universal joints 16 and 18 respectively connected to an output shaft 20 of the driving component 12 and an input shaft 22 of the driven component 14. The universal joints 16 and 18 are conventional and are connected to the shafts 20 and 22 in conventional ways so that detailed descriptions are not necessary.

The drive train 10 includes a coupling 24 of the invention interconnecting the universal joints 16 and 18. The coupling 24 comprises a cup-shaped, internally splined, outer member 26 connected to the universal joint 18 in any suitable manner. The coupling 24 also includes a cup-shaped, externally splined inner member 28 connected to the universal joint 16.

More particularly, the cup-shaped inner member 28 is provided therein with an integral coaxial shaft 30 suitably connected to the universal joint 16. With this construction, i.e., by providing the coaxial shaft 30 within the cup-shaped inner member 28, substantial shortening of the overall length of the drive train 10 is achieved, which is an important feature.

The inner member 28 is telescopically disposed within the outer member 26 in unrestrained sliding engagement therewith in the axial direction between two axially spaced stops 32 and 34. More particularly, the external splines 36 on the inner member 28 slidably engaged the inner periphery of the cup-shaped outer member 26 to maintain concentricity of the outer and inner members. Consequently, no unbalance due to lack of concentricity is introduced, which is an important feature.

As indicated above, the inner member 28 can slide unrestrainedly between the limits imposed by the stops 32 and 34. The stop 32 is formed by the end wall of the cup-shaped outer member 26, while the stop 34 is an annulus detachably secured to the open end of the cup-shaped outer member 26 by screws 38, or the like. With this construction, the coupling 24 can be assembled and disassembled readily, which is important for a reason to be discussed.

The external splines 36 on the inner member 28 and the internal splines 40 on the outer member 26 are interleaved and spaced apart circumferentially, as will be clear from FIG. 2. Elastomeric cushions 42, preferably of Teflon, or a similar material, are interposed between the respective external and internal splines 36 and 40 and conform in configuration to the spaces between such splines. These cushions, in operation of the drive train 10, serve to damp torsional vibration, which is an important feature. Preferably, the length of the cushions 42 is equal to the distance between the stops 32 and 34. If replacement of the cushions 42 is necessary at any time, this can be accomplished readily by removing the stop 34 to permit disassembly of the coupling 24.

An important feature of the invention is that the length of the inner member 28, or, more accurately, the length of the external splines 36 on the inner member, is substantially less than the spacing of the stops 32 and 34 so as to permit substantial axial relative movement of the outer and inner members 26 and 28. For example, the difference between the spacing of the stops 32 and 34 and the length of the inner member 28 is preferably at least about 6 percent of the center-to-center spacing of the universal joints 16 and 18.

With the foregoing construction, the coupling 24 can accommodate major relative axial displacements of the driving and driven components 12 and 14. This is particularly important in a vehicle, for example, where substantial fore-and-aft displacements of a differential relative to a transmission may occur.

Although an exemplary embodiment of the invention has been disclosed for purposes of illustration, it will be understood that various changes, modifications and substitutions may be incorporated in such embodiment without departing from the spirit of the invention as defined by the claims which follow.

I claim:

1. In a flexible rotary drive train, the combination of:
 a. two axially spaced universal joints;
 b. a coupling interconnecting said universal joints;
 c. said coupling including an internally splined outer member connected to one of said universal joints;
 d. said coupling including an externally splined inner member connected to the other of said universal joints;
 e. said inner member being telescopically disposed within said outer member in unrestrained sliding engagement therewith in the axial direction;
 f. the internal splines on said outer member being disposed between and spaced circumferentially from the external splines on said inner member;
 g. elastomeric cushions interposed between said internal splines on said outer member and said external splines on said inner member;
 h. axially spaced stops on said outer member for limiting axial movement of said inner member relative to said outer member;
 i. the length of said inner member being substantially less than the spacing of said stops to permit substantial axial relative movement of said outer and inner members; and
 j. said inner member being cup shaped and being provided therein with a coaxial shaft connected to said inner member and to said other universal joint.

2. A flexible rotary drive train as set forth in claim 1 wherein the difference between the spacing of said stops and the length of said inner member is at least about 6 percent of the center-to-center spacing of said universal joints.

3. A flexible rotary drive train according to claim 1 wherein one of said stops is an annular stop detachably connected to said outer member so that it may be removed to permit withdrawal of said inner member from said outer member for replacement of said cushions.

* * * * *